United States Patent
Otto et al.

(10) Patent No.: US 9,324,023 B2
(45) Date of Patent: *Apr. 26, 2016

(54) SELF LEARNING METHOD AND SYSTEM FOR MANAGING A GROUP REWARD SYSTEM

(75) Inventors: Jonathan Otto, Palm Beach, FL (US); Andrew Van Luchene, Santa Fe, NM (US)

(73) Assignee: RetailDNA, LLC, Garden City Park, NY (US)

( * ) Notice: Subject to any disclaimer, the term of this patent is extended or adjusted under 35 U.S.C. 154(b) by 922 days.

This patent is subject to a terminal disclaimer.

(21) Appl. No.: 13/551,581

(22) Filed: Jul. 17, 2012

(65) Prior Publication Data
US 2013/0024263 A1    Jan. 24, 2013

Related U.S. Application Data (63) Continuation of application No. 12/378,225, filed on Feb. 12, 2009, now Pat. No. 8,224,760, which is a continuation-in-part of application No. 12/151,043, filed on May 2, 2008, now abandoned, and a (Continued)

(51) Int. Cl.
| | | |
|---|---|---|
| *G06F 15/18* | (2006.01) | |
| *G06N 3/12* | (2006.01) | |
| *G06Q 30/02* | (2012.01) | |
| *G06Q 40/00* | (2012.01) | |

(52) U.S. Cl.
CPC .................. *G06N 3/12* (2013.01); *G06Q 30/02* (2013.01); *G06Q 30/0215* (2013.01); *G06Q 40/12* (2013.12)

(58) Field of Classification Search
USPC .......................................................... 706/12
See application file for complete search history.

(56) References Cited

U.S. PATENT DOCUMENTS

| | | |
|---|---|---|
| 5,794,207 A | 8/1998 | Walker et al. |
| 6,052,667 A | 4/2000 | Walker et al. |
| 6,085,169 A | 7/2000 | Walker et al. |

(Continued)

OTHER PUBLICATIONS

Autonomous Agreement-Mediation Based on WS-agreement for Improving Cloud SLAs Stanik, A.; Sander, F.; Kao, O. Cloud Computing Technology and Science (CloudCom), 2014 IEEE 6th International Conference on Year: 2014 pp. 583-590, DOI: 10.1109/CloudCom.2014.25 IEEE Conference Publications.*

(Continued)

*Primary Examiner* — Michael B Holmes
(74) *Attorney, Agent, or Firm* — Michael D. Downs; Fincham Downs, LLC (57) ABSTRACT

A system for managing a purchase agreement, including: a memory element for at least one specially-programmed general purpose computer for storing an artificial intelligence program (AIP) and a purchase agreement between a customer and at least one business entity, the purchase agreement including at least one requirement regarding at least one retail transaction between the customer and the business entity; a processor in the specially-programmed general purpose computer for: compiling a purchasing history for the customer with respect to the business entity and the purchase agreement, the memory element for storing the purchasing history, and modifying, using the purchasing history and the AIP, the at least one requirement to increase revenue or profitability of the business entity; and an interface element in the specially-programmed general purpose computer for transmitting the modified at least one requirement for presentation to the customer.

12 Claims, 3 Drawing Sheets

Related U.S. Application Data continuation-in-part of application No. 11/983,679, filed on Nov. 9, 2007, now abandoned, and a continuation-in-part of application No. 09/993,228, filed on Nov. 14, 2001, now abandoned.

(56) References Cited

U.S. PATENT DOCUMENTS

| | | | |
|---|---|---|---|
| 6,119,100 | A | 9/2000 | Walker et al. |
| 6,223,163 | B1 | 4/2001 | Van Luchene |
| 6,230,150 | B1 | 5/2001 | Walker et al. |
| 6,267,670 | B1 | 7/2001 | Walker et al. |
| 6,298,329 | B1 | 10/2001 | Walker et al. |
| 6,298,331 | B1 | 10/2001 | Walker et al. |
| 6,507,279 | B2 | 1/2003 | Loof |
| 6,553,346 | B1 | 4/2003 | Walker et al. |
| 6,567,787 | B1 | 5/2003 | Walker et al. |
| 6,598,024 | B1 | 7/2003 | Walker et al. |
| 6,985,879 | B2 | 1/2006 | Walker et al. |
| 7,028,894 | B2 | 4/2006 | Turner et al. |
| 7,072,850 | B1 | 7/2006 | Van Luchene |
| 7,162,458 | B1 | 1/2007 | Flanagan et al. |
| 7,184,990 | B2 | 2/2007 | Walker et al. |
| 7,194,442 | B1 | 3/2007 | Flanagan et al. |
| 7,272,569 | B1 | 9/2007 | Walker et al. |
| 7,318,041 | B2 | 1/2008 | Walker et al. |
| 7,370,007 | B2 | 5/2008 | Schwarze et al. |
| 7,389,919 | B2* | 6/2008 | Walker .............. G06Q 20/209 235/380 |
| 7,437,344 | B2 | 10/2008 | Peyrelevade |
| 7,505,921 | B1 | 3/2009 | Lukas et al. |
| 7,542,919 | B1 | 6/2009 | Mueller et al. |
| 7,756,746 | B2 | 7/2010 | Walker et al. |
| 8,041,667 | B2* | 10/2011 | Otto .......................... G06N 3/12 706/47 |
| 8,224,760 | B2* | 7/2012 | Otto .......................... G06N 3/12 706/45 |
| 8,306,937 | B2* | 11/2012 | Otto .......................... G06N 3/12 706/47 |
| 8,577,819 | B2* | 11/2013 | Otto .......................... G06N 3/12 706/15 |
| 8,600,924 | B2* | 12/2013 | Otto .......................... G06N 3/12 706/47 |
| 8,688,613 | B2* | 4/2014 | Otto .......................... G06N 3/12 706/47 |
| 8,762,209 | B2* | 6/2014 | Walker .............. G06Q 20/209 221/106 |
| 9,117,224 | B2* | 8/2015 | Otto .................. G06Q 30/0224 |
| 2003/0018531 | A1 | 1/2003 | Mahaffy et al. |
| 2003/0083936 | A1 | 5/2003 | Mueller et al. |
| 2005/0055236 | A1 | 3/2005 | Bondy et al. |
| 2005/0203771 | A1 | 9/2005 | Achan |
| 2006/0033625 | A1 | 2/2006 | Johnson et al. |
| 2006/0052888 | A1 | 3/2006 | Bayoumi et al. |
| 2006/0059032 | A1 | 3/2006 | Wong et al. |
| 2007/0250388 | A1 | 10/2007 | Walker et al. |
| 2008/0306790 | A1 | 12/2008 | Otto et al. |
| 2008/0313052 | A1 | 12/2008 | Otto et al. |
| 2008/0313122 | A1 | 12/2008 | Otto et al. |
| 2009/0024481 | A1 | 1/2009 | Otto et al. |
| 2009/0030797 | A1 | 1/2009 | Otto et al. |
| 2009/0030798 | A1 | 1/2009 | Otto et al. |
| 2009/0125380 | A1 | 5/2009 | Otto et al. |
| 2009/0125396 | A1 | 5/2009 | Otto et al. |
| 2009/0132344 | A1 | 5/2009 | Otto et al. |
| 2009/0182677 | A1 | 7/2009 | Otto et al. |

OTHER PUBLICATIONS

Modelling customer demand response to dynamic price signals using artificial intelligence Roos, J.G.; Kern, C.F. Metering and Tariffs for Energy Supply, Eighth International Conference on (Conf. Publ. No. 426) Year: 1996 pp. 213-217, DOI: 10.1049/cp:19960509 IET Conference Publications.*

Adaptive Scheduling on Power-Aware Managed Data-Centers Using Machine Learning Berral, J.L.; Gavalda, R.; Torres, J. Grid Computing (GRID), 2011 12th IEEE/ACM International Conference on Year: 2011 pp. 66-73, DOI: 10.1109/Grid.2011.18 IEEE Conference Publications.*

Cost-Aware Dynamic Virtual Machine Purchase Plan Orchestrator for Multi-tier Cloud Applications He Zhao; Chenglei Peng; Yao Yu; Yu Zhou; Ziqiang Wang; Sidan Du Cloud and Green Computing (CGC), 2013 Third International Conference on Year: 2013 pp. 514-520, DOI: 10.1109/CGC.2013.86 IEEE Conference Publications.*

U.S. Appl. No. 08/943,483, filed Oct. 3, 1997, by Walker et al., abandoned, 50 pages.

U.S. Appl. No. 09/045,347, filed Mar. 20, 1998, by Alderucci et al., abandoned, 29 pages.

U.S. Appl. No. 09/083,689, filed May 21, 1998, by Van Luchene, abandoned, 50 pages.

U.S. Appl. No. 09/098,240, filed Jun. 16, 1998, by Walker et al., abandoned, 50 pages.

U.S. Appl. No. 09/282,747, filed Mar. 31, 1999, by Walker et al., abandoned, 89 pages.

U.S. Appl. No. 09/538,751, filed Mar. 30, 2000, by Walker et al., abandoned, 82 pages.

U.S. Appl. No. 60/239,610, filed Oct. 11, 2000, by Mueller et al., expired, 99 pages.

Office Action mailed Oct. 14, 2011, in U.S. Appl. No. 12/378,225, 15 pages.

Notice of Allowability mailed Feb. 27, 2012, in U.S. Appl. No. 12/378,225, 6 pages.

* cited by examiner

SELF LEARNING METHOD AND SYSTEM FOR MANAGING A GROUP REWARD SYSTEM

CROSS-REFERENCE TO RELATED APPLICATIONS

This is a continuation application of U.S. patent application Ser. No. 12/378,225, filed Feb. 12, 2009 and entitled "SELF-LEARNING METHOD AND SYSTEM FOR MANAGING A GROUP REWARD SYSTEM," which is a continuation-in-part patent application under 35 USC 120 of U.S. patent application Ser. No. 12/151,043, filed May 2, 2008 and entitled "Method and System For Centralized Generation of a Business Executable Using Genetic Algorithms and Rules Distributed Among Multiple Hardware Devices," which is a continuation-in-part of U.S. patent application Ser. No. 11/983,679, filed Nov. 9, 2007 and entitled "Method and System for Generating, Selecting, and Running Executables in a Business System Utilizing a Combination of User Defined Rules and Artificial Intelligence," which is a continuation-in-part patent application under 35 USC 120 of U.S. patent application Ser. No. 09/993,228, filed Nov. 14, 2001 and entitled "Method and apparatus for dynamic rule and/or offer generation," which applications are incorporated herein by reference.

This application is related to: U.S. patent application Ser. No. 09/052,093 entitled "Vending Machine Evaluation Network" and filed Mar. 31, 1998; U.S. patent application Ser. No. 09/083,483 entitled "Method and Apparatus for Selling an Aging Food Product" and filed May 22, 1998; U.S. patent application Ser. No. 09/282,747 entitled "Method and Apparatus for Providing Cross-Benefits Based on a Customer Activity" and filed Mar. 31, 1999; U.S. patent application Ser. No. 08/943,483 entitled "System and Method for Facilitating Acceptance of Conditional Purchase Offers (CPOs)" and filed on Oct. 3, 1997, which is a continuation-in-part of U.S. patent application Ser. No. 08/923,683 entitled "Conditional Purchase Offer (CPO) Management System For Packages" and filed Sep. 4, 1997, which is a continuation-in-part of U.S. patent application Ser. No. 08/889,319 entitled "Conditional Purchase Offer Management System" and filed Jul. 8, 1997, which is a continuation-in-part of U.S. patent application Ser. No. 08/707,660 entitled "Method and Apparatus for a Cryptographically Assisted Commercial Network System Designed to Facilitate Buyer-Driven Conditional Purchase Offers," filed on Sep. 4, 1996 and issued as U.S. Pat. No. 5,794,207 on Aug. 11, 1998; U.S. patent application Ser. No. 08/920,116 entitled "Method and System for Processing Supplementary Product Sales at a Point-Of-Sale Terminal" and filed Aug. 26, 1997, which is a continuation-in-part of U.S. patent application Ser. No. 08/822,709 entitled "System and Method for Performing Lottery Ticket Transactions Utilizing Point-Of-Sale Terminals" and filed Mar. 21, 1997; U.S. patent application Ser. No. 09/135,179 entitled "Method and Apparatus for Determining Whether a Verbal Message Was Spoken During a Transaction at a Point-Of-Sale Terminal" and filed Aug. 17, 1998; U.S. patent application Ser. No. 09/538,751 entitled "Dynamic Propagation of Promotional Information in a Network of Point-of-Sale Terminals" and filed Mar. 30, 2000; U.S. patent application Ser. No. 09/442,754 entitled "Method and System for Processing Supplementary Product Sales at a Point-of-Sale Terminal" and filed Nov. 12, 1999; U.S. patent application Ser. No. 09/045,386 entitled "Method and Apparatus For Controlling the Performance of a Supplementary Process at a Point-of-Sale Terminal" and filed Mar. 20, 1998; U.S. patent application Ser. No. 09/045,347 entitled "Method and Apparatus for Providing a Supplementary Product Sale at a Point-of-Sale Terminal" and filed Mar. 20, 1998; U.S. patent application Ser. No. 09/083,689 entitled "Method and System for Selling Supplementary Products at a Point-of-Sale and filed May 21, 1998; U.S. patent application Ser. No. 09/045,518 entitled "Method and Apparatus for Processing a Supplementary Product Sale at a Point-of-Sale Terminal" and filed Mar. 20, 1998; U.S. patent application Ser. No. 09/076,409 entitled "Method and Apparatus for Generating a Coupon" and filed May 12, 1998; U.S. patent application Ser. No. 09/045,084 entitled "Method and Apparatus for Controlling Offers that are Provided at a Point-of-Sale Terminal" and filed Mar. 20, 1998; U.S. patent application Ser. No. 09/098,240 entitled "System and Method for Applying and Tracking a Conditional Value Coupon for a Retail Establishment" and filed Jun. 16, 1998; U.S. patent application Ser. No. 09/157,837 entitled "Method and Apparatus for Selling an Aging Food Product as a Substitute for an Ordered Product" and filed Sep. 21, 1998, which is a continuation of U.S. patent application Ser. No. 09/083,483 entitled "Method and Apparatus for Selling an Aging Food Product" and filed May 22, 1998; U.S. patent application Ser. No. 09/603,677 entitled "Method and Apparatus for selecting a Supplemental Product to offer for Sale During a Transaction" and filed Jun. 26, 2000; U.S. Pat. No. 6,119,100 entitled "Method and Apparatus for Managing the Sale of Aging Products and filed Oct. 6, 1997 and U.S. Provisional Patent Application Ser. No. 60/239,610 entitled "Methods and Apparatus for Performing Upsells" and filed Oct. 11, 2000.

By "related to" we mean that the present application and the applications noted above are in the same general technological area and have a common inventor or assignee. However, "related to" does not necessarily mean that the present application and any or all of the applications noted above are patentably indistinct, or that the filing date for the present application is within two months of any of the respective filing dates for the applications noted above.

FIELD OF THE INVENTION

The invention relates generally to a method and system for managing a purchasing agreement and, more particularly, to a method and system for providing such management using artificial intelligence.

BACKGROUND OF THE INVENTION

Purchase agreements have been used, as disclosed in U.S. Published Patent Applications 2007/0250388 (Walker et al.), incorporated by reference herein.

SUMMARY OF THE INVENTION

The invention broadly comprises a system for managing a purchase agreement, including: a memory element for at least one specially-programmed general purpose computer, for storing an artificial intelligence program (AIP), and a first purchase agreement between a customer and at least one business entity, the first purchase agreement including at least one first requirement regarding at least one first retail transaction between the customer and the at least one business entity; a processor in the at least one specially-programmed general purpose computer for: compiling a first purchasing history for the customer with respect to the at least one business entity and the first purchase agreement, the memory element for storing the first purchasing history and modifying, using the processor, the first purchasing history, and the AIP, the at least one first requirement to increase revenue or profitability of the at least one business entity; and an interface element in the at least one specially-programmed general purpose computer for transmitting the modified at least one first requirement for presentation to the customer.

In one embodiment, the processor is for: modifying the at least one first requirement using an operational or financial parameter regarding the at least one business entity; or generating, using the processor and the AIP, the first purchase agreement to increase revenue or profitability of the at least one business entity. In another embodiment, the processor is for generating the first purchase agreement using an operational or financial parameter regarding the at least one business entity, or using a second purchasing history for the first customer.

In one embodiment, the memory element is for storing a second purchase agreement between the customer and the at least one business entity, the second purchase agreement including at least one second requirement regarding at least one second retail transaction between the customer and the at least one business entity; and the processor is for: compiling a second purchasing history for the customer with respect to the at least one business entity and the at least one second purchase agreement, the memory element for storing the respective second purchasing history in the memory element; determining, using the first and second purchasing histories, a relative profitability of the first and second purchasing agreements; and modifying, using the relative profitability and the AIP, the first or second requirement to increase revenue or profitability of the at least one business entity.

In one embodiment, the interface element is for receiving an offer from the customer to enter into a third purchase agreement with the at least one business entity, the third purchase agreement including at least one third requirement regarding at least one third retail transaction between the customer and the at least one business entity, and the processor is for: determining a profitability of the third purchase agreement; and for a profitability less than a specified value, modifying, using the processor and the AIP, the at least one third requirement to increase revenue or profitability of the at least one business entity. The interface element is for transmitting the modified at least one third requirement.

In one embodiment, the processor is for determining, using the AIP, an incentive with respect to compliance with the first purchase agreement and the interface element is for transmitting the incentive with the modified at least one first requirement.

The invention also broadly comprises a system for managing a purchase agreement, including: a memory element for at least one specially-programmed general purpose computer for storing an artificial intelligence program (AIP); a processor for the at least one specially-programmed general purpose computer for: generating, using the AIP, a first purchase agreement between a customer and at least one business entity, the first purchase agreement to increase revenue or profitability of the at least one business entity and including at least one first requirement regarding at least one first retail transaction between the customer and the at least one business entity; compiling a first purchasing history for the customer with respect to the at least one business entity and the first purchase agreement, the memory element for storing the first purchasing history; and modifying, using the first purchasing history and the AIP, the at least one first requirement to increase revenue or profitability of the at least one business entity; and an interface element in the at least one specially-programmed general purpose computer for transmitting, the modified at least one first requirement for presentation to the customer.

The invention further broadly comprises a system for managing a purchase agreement, including: an interface element for at least one specially-programmed general purpose computer for receiving an offer from a customer to enter into a purchase agreement with at least one business entity, the first purchase agreement including at least one first requirement regarding at least one first retail transaction between the customer and the at least one business entity; a memory element for the at least one specially-programmed general purpose computer for storing an artificial intelligence program (AIP); and a processor for the at least one specially-programmed general purpose computer for: determining a profitability of the first purchase agreement; and for a profitability less than a specified value, modifying, using the AIP, the at least one first requirement to increase revenue or profitability of the at least one business entity. The interface element is for transmitting the modified at least one first requirement for presentation to the customer.

The invention still further broadly comprises a method for managing a purchase agreement.

It is a general object of the present invention to provide a system and a method to manage a purchasing agreement that is dynamic and can be readily adapted to meet various and variable requirements.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing Figures, in which.

DETAILED DESCRIPTION OF THE PREFERRED EMBODIMENT

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein shall include the same meaning as commonly understood to one of ordinary skill in the art to which this invention belongs. Although any methods, devices or materials similar or equivalent to those described herein can be used in the practice or testing of the invention, the preferred methods, devices, and materials are now described.

It should be understood that the use of "or" in the present application is with respect to a "non-exclusive" arrangement, unless stated otherwise. For example, when saying that "item x is A or B," it is understood that this can mean one of the following: 1) item x is only one or the other of A and B; and 2) item x is both A and B. Alternately stated, the word "or" is not used to define an "exclusive or" arrangement. For example, an "exclusive or" arrangement for the statement "item x is A or B" would require that x can be only one of A and B.

Figure 1:
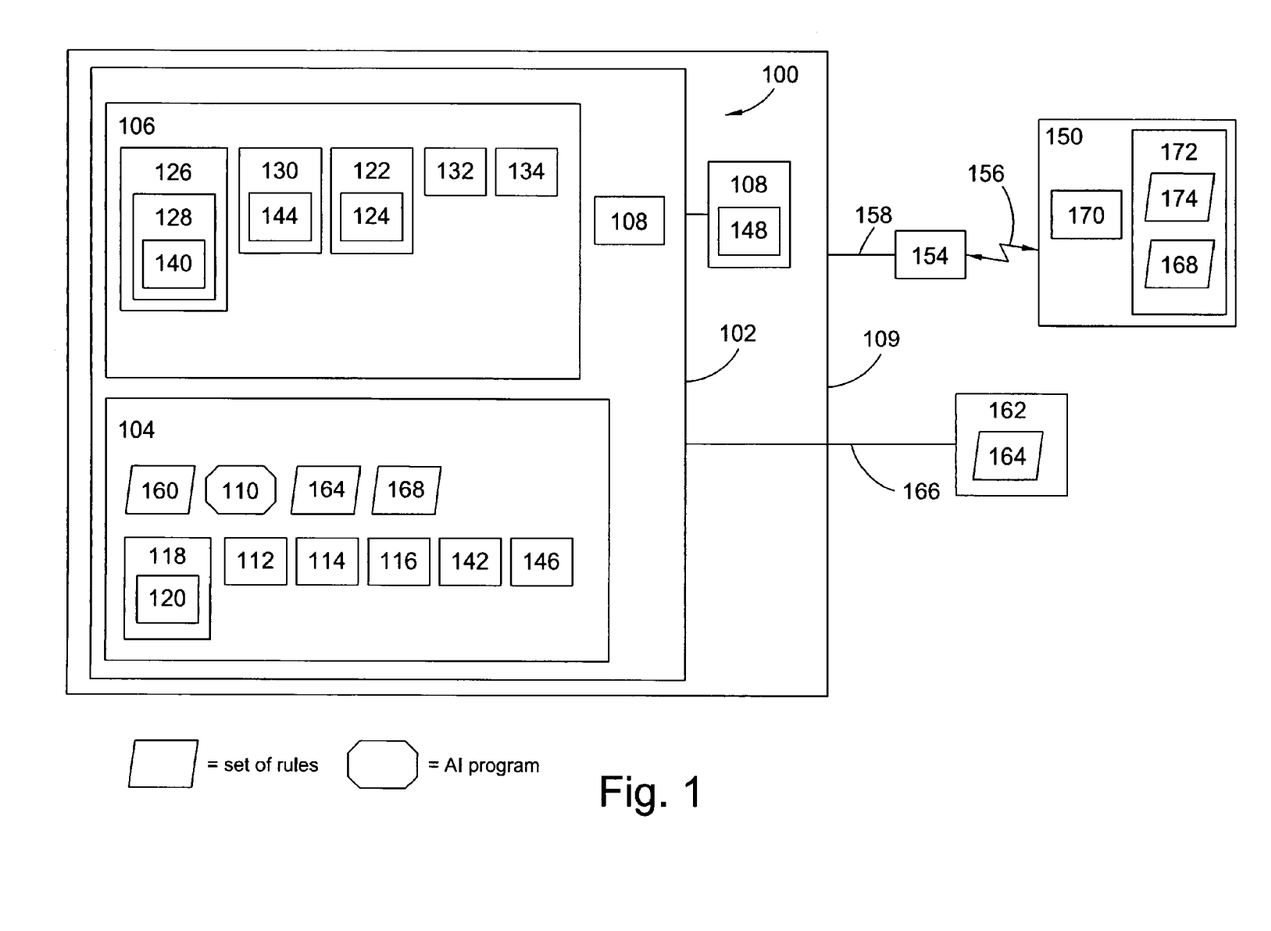
FIG. 1 is a schematic block diagram of an embodiment of present invention system for managing a purchase agreement.

FIG. 1 is a schematic block diagram of an embodiment of present invention system 100 for managing a purchase agreement. The system includes at least one specially-programmed general purpose computer, for example, computer 102, with memory element 104, processor 106, and interface element 108. By interface element, we mean any combination of hardware, firmware, or software in a computer used to enable communication or data transfer between the computer and a device, system, or network external to the computer. The interface element can connect with the device, system, or network external to the computer using any means known in the art, including, but not limited to a hardwire connection, an optical connection, an Internet connection, or a radio frequency connection. Processor 106 and interface element 108 can be any processor or interface element, respectively, or combination thereof, known in the art.

Computer 102 can be any computer or plurality of computers known in the art. In one embodiment, the computer is located in a retail location with which system 100 is associated, for example, location 109. In another embodiment (not shown), all or parts of the computer are remote from retail locations with which system 100 is associated. In a further embodiment, computer 102 is associated with a plurality of retail locations with which system 100 is associated. Thus, the computer provides the functionality described for more than one retail location.

The memory element is for storing artificial intelligence program (AIP) 110, metrics 112, 114, and 116, and data 118 identifying a plurality of customers 120. Data 118 can be obtained by any means known in the art. The processor is for selecting, using metric 112 and the AIP, data 122 from data 118, data 122 identifying plurality of customers 124 from plurality of customers 120. In one embodiment, plurality of customers 124 is a sub-set of plurality of customers 120. That is, the processor selects only some of the customers in plurality of customers 120 based on the data, metric, and application of AI. The processor also generates, using metric 114 and the AIP, agreement 126 between plurality of customers 124 and at least one business entity, for example, a business entity associated with location 109. The purchase agreement includes at least one requirement 128 regarding retail transactions between plurality of customers 124 and the at least one business entity. The processor generates, using metric 114 and the AIP, incentive 130. The rewarding of the incentive is conditional upon satisfaction of the at least one requirement. The interface element is for transmitting the agreement and the incentive for presentation to at least one customer from plurality of customers 124.

In one embodiment, the processor compiles operational data 132 regarding profitability of the at least one business entity and creates, using the operational data and the AIP, one or more of metrics 112, 114, or 116. Operational data 132 can be any such data known in the art. In one embodiment, the processor compiles history 134 of transactions conducted by plurality of customers 124. The processor creates, using the AIP and history, metrics 112, 114, or 116; or selects plurality of customers 124 using the history.

In one embodiment, the processor compiles history 136 of transactions conducted by plurality of customers 124. The processor modifies, using the AIP and history 136, the agreement; or modifies, using the AIP and history 136, the incentive. In one embodiment, the processor compiles history 138 of transactions conducted by plurality of customers 124. The processor does at least one of the following: generating agreement 122 using history 138; or generating the incentive using history 138.

In one embodiment, requirement 128 includes respective requirements 140 for at least two customers in plurality of customers 124 and at least two of requirements 140 are different. In one embodiment, at least one metric 142 is stored in the memory element and the processor uses metric 142 and the AIP to determine requirements 140. In one embodiment, incentive 130 includes respective incentives 144 for at least two customers in plurality of customers 124 and at least two of incentives 144 are different. In one embodiment, at least one metric 146 is stored in the memory element and the processor uses metric 146 and the AIP to determine incentives 144. Thus, in the two embodiments noted above, system 100 is able to differentiate among members of a group of customers and provide individualized requirements and incentives.

Figure 2:
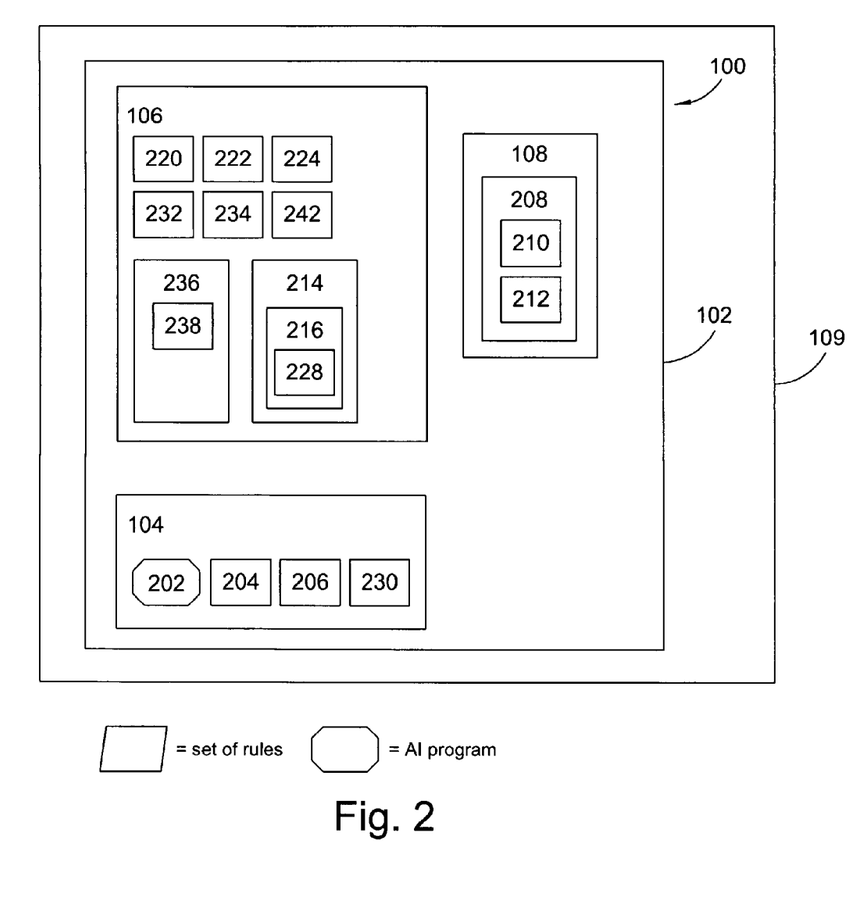
FIG. 2 is a schematic block diagram of an embodiment of a system for managing a purchase agreement.

FIG. 2 is a schematic block diagram of an embodiment of present invention system 100 for managing a purchase agreement. Memory element 104 stores AIP 202 and metrics 204 and 206. Interface element 108 is adapted for receiving request 208 identifying plurality of customers 210 and desired incentive 212. Processor 106 generates, using AIP 202 and metric 204, agreement 214 between plurality of customers 210 and at least one business entity, for example, the entity associated with location 109. Agreement 214 includes at least one requirement 216 regarding retail transactions between plurality of customers 210 and the at least one business entity. The processor also is for generating, using incentive 212, metric 206, and AIP 202, incentive 220. The rewarding of incentive 220 is conditional upon satisfaction of requirement 216. The interface element is for transmitting agreement 214 and incentive 220 for presentation to at least one customer from plurality of customers 210.

In one embodiment, the processor is for: compiling operational data 222 regarding profitability of the at least one business entity and creating, using the operational data and AIP 202, metric 204 or 206. In one embodiment, the processor is for: compiling history 224 of transactions conducted by plurality of customers 210. The processor creates, using AIP 202 and history 224, metric 204 or 206; or generates agreement 214 using history 224; or generates incentive 220 using the history.

In one embodiment, the processor is for compiling history 226 of transactions conducted by plurality of customers 210. The processor modifies agreement 214 using AIP 202 and history 226; or modifies incentive 220 using AIP 202 and history 226. In one embodiment, requirements 216 includes respective requirements 228 for at least two customers in plurality of customers 210 and at least two of requirements 228 are different.

In one embodiment, the memory element stores metric 230 and the processor is for compiling history 232 of transactions conducted by plurality of customers 210. The processor also is for selecting plurality of customers 234 from plurality of customers 210 using history 232, metric 230, and AIP 202. Plurality of customers 234 is a subset of plurality of customers 210. That is, plurality of customers 234 includes less than all of plurality of customers 210. The processor generates, using AIP 202 and metric 230, agreement 236 between plurality of customers 234 and the at least one business entity. Agreement 236 includes at least one requirement 238 regarding retail transactions between plurality of customers 234 and the at least one business entity. The processor also is for generating incentive 242, using incentive 212, metric 204, and AIP 202. The rewarding of incentive 242 is conditional upon satisfaction of requirements 238.

Figure 3:
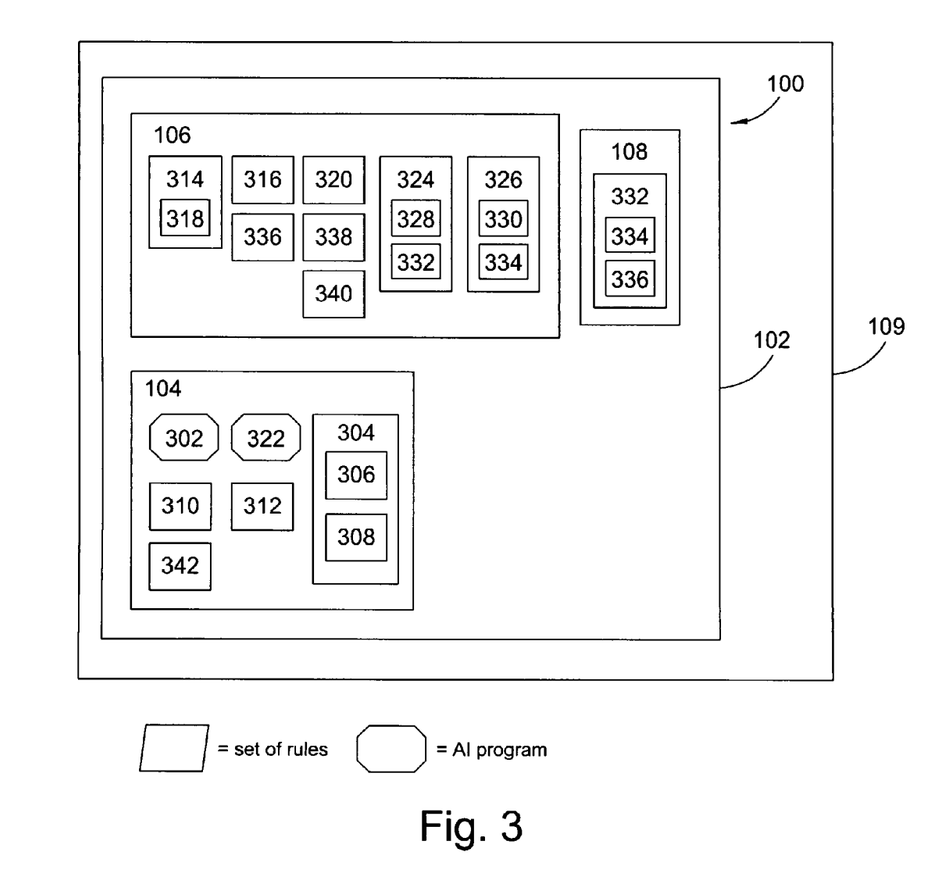
FIG. 3 is a schematic block diagram of an embodiment of a system for managing a purchase agreement.

FIG. 3 is a schematic block diagram of embodiments of present invention system 100 for managing a purchase agreement. The following describes one embodiment of system 100. Memory element 104 stores AIP 302 and purchase agreement 304 between plurality of customers 306 and at least one business entity, for example, the entity associated with location 109. The purchase agreement includes requirement 308 regarding retail transactions between the plurality of customers and the at least one business entity. The memory element also stores incentive 310 and value 312 for the incentive. The rewarding of the incentive is conditional upon completion of the requirement.

Processor 106 is for compiling history 314 of transactions between the plurality of customers and the at least one business entity. The processor determines compliance 316 of transactions 318 included in the history of transactions with the requirement; or determines profitability 320 of the at least one business entity with respect to the history. The processor also modifies, using the AIP and the history, the value of the incentive to encourage compliance of the plurality of customers with the requirement; or modifies, using the AIP and the history, the incentive to increase profitability of the at least one business entity with respect to future transactions between the plurality of customers and the at least one business entity. Interface element 108 is for transmitting the modified value or the modified incentive for presentation to at least one customer from the plurality of customers.

The following describes one embodiment of system 100. Memory element 104 is for storing AIP 322. Processor 106 is for generating, using AIP 322, purchase agreements 324 and 326 between a customer (not shown) and at least one business entity, for example, the entity associated with location 109. Purchase agreements 324 and 326 include requirements 328 and 330, respectively, regarding at least one respective retail transaction between the customer and the at least one business entity. The processor compiles purchasing history 336 for the customer with respect to the at least one business entity and agreements 324 and 326; determines, using history 336, relative profitability 338 of agreements 324 and 326; and modifies, using the relative profitability and AIP 322, requirement 328 or 330 to increase revenue or profitability of the at least one business entity. Interface element 108 is for transmitting modified requirement 328 or 330 for presentation to the customer.

In one embodiment, the interface element is for receiving offer 332 from the customer to enter into purchase agreement 334 with the at least one business entity. Purchase agreement 334 including requirement 336 regarding at least one third retail transaction between the customer and the at least one business entity. The processor determines profitability 340 of agreement 334, and for a profitability less than specified value 342, stored in the memory element, modifies requirement 336 using AIP 322. The interface element is for transmitting modified requirement 336 for presentation to the customer.

The following should be viewed in light of FIGS. 1 through 3. Although FIG. 1 is used as an example, in the discussion that follows, it should be understood that the discussion is applicable to FIGS. 2 and 3 as well. In one embodiment, an agreement or incentive, such as agreement 126 and incentive 130, respectively, can be presented using any means known in the art, for example, a graphical user interface (GUI) (not shown). In one embodiment, an agreement or incentive, such as agreement 126 and incentive 130, respectively, is transmitted for presentation on a wireless communications device (WCD), for example, WCD 150. WCD 150 can be any WCD known in the art. Commonly-owned and co-pending U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008 is applicable to interaction of the WCD and system 100. In another embodiment, an agreement or incentive, such as agreement 126 and incentive 130, respectively, is transmitted for presentation on any point of sale (POS) station known in the art, for example, POS station 152 in location 109. In a further embodiment (not shown), an agreement or incentive, such as agreement 126 and incentive 130, respectively, is transmitted for presentation on any device, remote from a location associated with the first business entity, such as location 109, known in the art, for example, a remote kiosk (not shown).

In one embodiment, a WCD usable with system 100, for example, WCD 150, is owned by, leased by, or otherwise already in possession of an end user when system 100 interfaces with the WCD. In the description that follows, it is assumed that the WCD is owned by, leased by, or otherwise already in possession of the end user when system 100 interfaces with the WCD. In general, the WCD communicates with a network, for example, network 154, via radio-frequency connection 156. Network 154 can be any network known in the art. In one embodiment, the network is located outside of the retail location, for example, the network is a commercial cellular telephone network. In one embodiment (not shown), the network is located in a retail location, for example, the network is a local network, such as a Bluetooth network. The interface element can connect with network 154 using any means known in the art, including, but not limited to a hardwire connection, an optical connection, an Internet connection, or a radio frequency connection. In the figures, a non-limiting example of a hardwire connection 158 is shown. In one embodiment, device 150 is connectable to a docking station (not shown) to further enable communication between device 150 and system 100. Any docking station or docking means known in the art can be used. That is, when the device is connected to the docking station, a link is established between the device and system 100.

The following should be viewed in light of FIGS. 1 through 3. Although FIG. 1 is used as an example, in the discussion that follows, it should be understood that the discussion is applicable to FIGS. 2 and 3 as well. In one embodiment, self learning system 100 adjusts agreements, such as agreement 126, based on the performance of one or more of the following parameters.

1. complaints registered by consumers/customers about a current agreement, such as agreement 126.
2. cancellations or reversals of a current agreement, such as agreement 126.
3. modification requests submitted by consumers to adjust a current agreement, such as agreement 126.
4. The profitability of the customer or class of customers.
5. The revenue and or profit generated to the retailer from a current agreement, such as agreement 126.
6. The subsidy a manufacturer is willing to provide for a product In one embodiment, self learning system 100 can control one or more of the following aspects of an agreement:

1. When and how reminders are sent to consumers. For example, an email reminder can be sent to a customer about their agreement two days before their next purchase is due.
2. What retailers the item can be purchased from
3. What products can have agreements. Whether or not the manufacturer of the product is willing to subsidize the agreement can have an effect on this.
4. The total dollar amount or number of products needed to be purchased to fulfill an agreement.
5. Price per unit of items in an agreement.
6. The purchase frequency for an agreement.
7. The frequency term of an agreement.
8. Start and end dates of an agreement.

In one embodiment, system 100 makes offers for agreements to customers where an item in a current transaction is free as long as the customers agree to the agreement. If the customers fail to honor the agreement, the purchase price for the original item is retroactively charged to the customer's credit card.

In one embodiment, a rebate check for the full purchase price of an item can be applied to a credit card if the customer fulfills an agreement offered at the time of purchase. In one embodiment, an end user device, such as WCD 150, can track agreements with multiple retailers. Prompts from each retailer can be transmitted to the device to remind the customer of their subscription obligations.

In one embodiment, the memory element stores at least one rule 160. In general, rule 160 can be used in place of or in conjunction with the AIP in any or all of the operations described infra and supra regarding the processor or the AIP. For example, the processor uses the rule in one or more of the following operations: to generate an, for example, agreement 126; to generate a requirement, for example, requirement 128, to generate an incentive, for example, incentive 130, or to create a metric, for example, one or more of metrics 112, 114, or 116.

In one embodiment, the processor generates or modifies rule 160 using the AIP. In another embodiment, the rule is modified using the AIP according to the operations described supra. Thus, the present invention is self-learning with respect to the rule and the rule can be automatically modified according to feed-back, modifications, or other benchmarks. It should be understood that a modified rule 160 can be used for any or all of the operations described supra or infra for rule 160. Commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007 is applicable to the operation of the AIP and rule 160.

In one embodiment, computer 162, separate from computer 102, transmits modifying rule 164 to computer 102. Computer 162 can be in location 109 (not shown) or can be in a different location. Computer 162 can be associated with a business entity associated with location 109 or can be associated with a different business entity. Connection 166 between computers 109 and 162 can be any type known in the art. In another embodiment (not shown), multiple computers 162 are included and respective computers among the multiple computers can be associated with the same or different business entities. Computer 102 stores modifying rule 164 in memory 104.

In one embodiment, rule 164 is used with or in place of rule 160, or is used in conjunction with the AIP. Commonly owned U.S. patent application Ser. No. 12/151,043, filed May 2, 2008 and entitled "Method and System For Centralized Generation of a Business Executable Using Genetic Algorithms and Rules Distributed Among Multiple Hardware Devices" is applicable to the respective operations of computer 102 with respect to rule 160.

In one embodiment, computer 102 receives at least one modifying rule 168 from a WCD associated with the customer, for example, WCD 150, and stores the rule in memory 104. In one embodiment, rule 168 is used with or in place of rule 160, or is used in conjunction with the AIP. Commonly owned U.S. patent application Ser. No. 12/151,043, filed May 2, 2008 and entitled "Method and System For Centralized Generation of a Business Executable Using Genetic Algorithms and Rules Distributed Among Multiple Hardware Devices" is applicable to the respective operations of computer 102 with respect to rule 168.

In one embodiment, a WCD, for example, WCD 150, with a processor and a memory element, for example, processor 170 and memory 172, is usable to receive an agreement, for example, agreement 126, or an incentive, for example, incentive 130. The memory element for the WCD stores at least one rule, for example, rule 174 and the processor for the WCD executes the agreement or the incentive according to the rule. Commonly-owned and co-pending U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008 is applicable to the operations described regarding WCD 150, processor 170, rule 174, and presentation of the agreement or the incentive.

In one embodiment, the incentive can be an offer related to a good or service. The good or service can be any good or service known in the art. The following commonly-owned U.S. patent applications are applicable to the use of the AIP and or the rules described supra to generate an incentive including an offer: U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007; commonly-owned U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008; commonly-owned U.S. patent application Ser. No. 12/151,038, titled: "METHOD AND APPARATUS FOR GENERATING AND TRANSMITTING AN ORDER INITIATION OFFER TO A WIRELESS COMMUNICATIONS DEVICE," inventors Otto et al., filed May 2, 2008; commonly-owned U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008; commonly-owned U.S. patent application Ser. No. 12/151,042, entitled "METHOD AND SYSTEM FOR GENERATING AN OFFER AND TRANSMITTING THE OFFER TO A WIRELESS COMMUNICATIONS DEVICE", filed May 2, 2008; commonly-owned U.S. patent application Ser. No. 12/151,042, entitled "METHOD AND SYSTEM FOR GENERATING AN OFFER AND TRANSMITTING THE OFFER TO A WIRELESS COMMUNICATIONS DEVICE", filed May 2, 2008; commonly-owned U.S. patent application entitled "SYSTEM AND METHOD FOR PROVIDING INCENTIVES TO AN END USER FOR REFERRING ANOTHER END USER", inventors Otto et al., filed Jul. 9, 2008; commonly-owned U.S. patent application entitled "METHOD AND SYSTEM FOR GENERATING A REAL TIME OFFER OR A DEFERRED OFFER", inventors Otto et al., filed Jul. 9, 2008; commonly-owned U.S. patent application entitled "METHOD AND APPARATUS FOR GENERATING AND TRANSMITTING AN IDEAL ORDER OFFER", inventors Otto et al., filed Jul. 9, 2008; commonly-owned U.S. patent application entitled "SYSTEM AND METHOD FOR GENERATING AND TRANSMITTING LOCATION BASED PROMOTIONAL OFFER REMINDERS", inventors Otto et al., filed Jul. 9, 2008; commonly-owned U.S. patent application entitled "SYSTEM AND METHOD FOR LOCATION BASED SUGGESTIVE SELLING", filed Jul. 9, 2008; and commonly-owned U.S. patent application entitled "SYSTEM AND METHOD FOR SCANNING A COUPON TO INITIATE AN ORDER", filed May 2, 2008.

Factors with respect to operational data 132, can include, but are not limited to optimizing or maximizing revenues, profits, item counts, average check, market basket contents, marketing offer acceptance, store visitation or other frequency measures, or improving or optimizing speed of service, inventory levels, turns, yield, waste, or enhancing or optimizing customer loyalty or use of kiosks or internet or other POS devices, or use of off peak or other coupons or acceptance of upsell or other marketing offers, or reduction or optimization of any customer or employee or any other person's gaming, fishing, or any other undesirable action or activities and/or failures to act when desired, or minimizing or optimizing any dilution or diversion of sales, profits, average check, or minimizing or optimizing use of discounts and other promotions so as to maximize or optimize any of the foregoing desired actions, outcomes or other desired benefits, or any combination of minimizing undesired results while maximizing or optimizing any one or more of any desired results.

Commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007, is applicable to the operations involving the AIP or any rules, noted supra and infra.

The discussion in commonly-owned U.S. patent application Ser. No. 11/983,679, filed Nov. 9, 2006 and entitled "Method and System for Generating, Selecting, and Running Executables in a Business System Utilizing a Combination of User Defined Rules and Artificial Intelligence" is applicable to modifications performed by the processor, the AIP, or rules.

It should be understood that various storage and removal operations, not explicitly described above, involving memory 104 and as known in the art, are possible with respect to the operation of system 100. For example, outputs from and inputs to the general-purpose computer can be stored and retrieved from the memory elements and data generated by the processor can be stored in and retrieved from the memory.

It should be understood that system 100 can be operated by the same business entity operating or owning a business location using the system, or can be operated by a third party different than the business entity operating or owning the business location using the system. In one embodiment, a third party operates system 100 as disclosed by commonly-owned U.S. patent application Ser. No. 11/985,141: "UPSELL SYSTEM EMBEDDED IN A SYSTEM AND CONTROLLED BY A THIRD PARTY," inventors Otto et al., filed Nov. 13, 2007.

It should be understood that system 100 can be integral with a computer operating system for a business location, for example, location 109 or with a business entity operating the business location. It also should be understood that system 100 can be wholly or partly separate from the computer operating system for a retail location, for example, location 109, or with a business entity operating the business location.

It should be understood that although individual rule sets and a single artificial intelligence program are discussed, various of the individual rule sets can be combined into composite rules set (not shown). Further, the functions described for a single AIP can be implemented by combinations of separate AIPs (not shown). Any combination of individual rule sets or artificial intelligence programs is included in the spirit and scope of the claimed invention.

In general, system 100, and in particular, the processor using the AI program, operates to use artificial intelligence, for example, a generic algorithm, to inform or make some or all of the decisions discussed in the description for FIG. 1. In one embodiment, system 100 performs the operations described herein to attain or maximize an objective of a business entity, for example, maximizing or increasing revenue or profitability. Factors usable to determine an objective can include, but are not limited to: customer acceptance rate, profit margin percentage, customer satisfaction information, service times, average check, inventory turnover, labor costs, sales data, gross margin percentage, sales per hour, cash over and short, inventory waste, historical customer buying habits, customer provided information, customer loyalty program data, weather data, store location data, store equipment package, POS system brand, hardware type and software version, employee data, sales mix data, market basket data, or trend data for at least one of these variables. Thus, the present invention, for example, system 100, specifically, computer 102 and processor 106, use artificial intelligence, for example, AIP 110 to automatically generate or modify operations, parameters, and outputs with respect to a goal, for example, maximizing or increasing revenue or profitability, and automatically adapts the generation or modification operations, parameters, and outputs to feedback, that is, the present invention is self-learning and self-adapting with respect to generating or modifying operations, parameters, and outputs. Further, the present invention can automatically generate or modify the goal and be self-learning and self-adapting with respect to the goal.

The present invention includes a computer-based method for managing a purchase agreement. Although the following method is depicted as a sequence for clarity, no order should be inferred from the sequence unless explicitly stated. A first step stores, in a memory element for at least one specially-programmed general purpose compute an artificial intelligence program (AIP), first, second, and third metrics, and first data identifying a first plurality of customers; a second step selects, using a processor in the at least one specially-programmed general purpose computer, second data from the first data, the second data identifying a second plurality of customers from the first plurality of customers and the selecting including use of the first metric and the AIP; a third step generates, using the processor, the second metric, and the AIP, an agreement between the second plurality of customers and at least one business entity, the purchase agreement including at least one requirement regarding retail transactions between the second plurality of customers and the at least one business entity; a fourth step generates, using the processor, the third metric, and the AIP, an incentive, the rewarding of the incentive conditional upon satisfaction of the at least one requirement; and a fifth step transmits, using an interface element in the at least one specially-programmed general purpose computer, the agreement and the incentive for presentation to at least one customer from the second plurality of customers.

The present invention includes a computer-based method for managing a purchase agreement. Although the following method is depicted as a sequence for clarity, no order should be inferred from the sequence unless explicitly stated. A first step stores, in a memory element for at least one specially-programmed general purpose compute an artificial intelligence program (AIP) and first and second metrics; a second step receives, using an interface element in the at least one specially-programmed general purpose computer, a request identifying a first plurality of customers and a desired incentive; a third step generates, using the processor, the AIP, and the first metric, a first agreement between the first plurality of customers and at least one business entity, the first agreement including at least one first requirement regarding a first plurality of retail transactions between the first plurality of customers and the at least one business entity; a fourth step generates, using the processor, the desired incentive, the second metric, and the AIP, a first incentive, the rewarding of the first incentive conditional upon satisfaction of the at least one first requirement; and a fifth step transmits, using an interface element in the at least one specially-programmed general purpose computer, the first agreement and the first incentive for presentation to at least one customer from the first plurality of customers.

The present invention includes a computer-based method for managing a purchase agreement. Although the following method is depicted as a sequence for clarity, no order should be inferred from the sequence unless explicitly stated. A first step stores, in a memory element for at least one specially-programmed general purpose computer: an artificial intelligence program (AIP); a purchase agreement between a plurality of customers and at least one business entity, the purchase agreement including a requirement regarding retail transactions between the plurality of customers and the at least one business entity; an incentive, the rewarding of the incentive conditional upon completion of the requirement; and a value of the incentive; a second step compiles, using a processor in the at least one specially-programmed general purpose computer, a history of transactions between the plurality of customers and the at least one business entity; and, a third step determines, using the processor, compliance of transactions included in the history of transactions with the requirement; or determines, using the processor, profitability of the at least one business entity with respect to the history; and, a fourth step modifies, using the processor, the AIP, and the history, the value of the incentive to encourage compliance of the plurality of customers with the requirement; or modifies, using the processor, the AIP, and the history, the incentive to increase profitability of the at least one business entity with respect to future transactions between the plurality of customers and the at least one business entity.

The present invention includes a computer-based method for managing a purchase agreement. Although the following method is depicted as a sequence for clarity, no order should be inferred from the sequence unless explicitly stated. A first step stores an artificial intelligence program (AIP) in a memory element for at least one specially-programmed general purpose computer; a second step generates, using a processor in at least one specially-programmed general purpose computer and the AIP, first and second purchase agreements between a customer and at least one business entity, the first and second purchase agreements including first and second requirements, respectively, regarding at least one first and second retail transaction, respectively, between the customer and the at least one business entity; a third step compiles, using a processor in the at least one specially-programmed general purpose computer, a purchasing history for the customer with respect to the at least one business entity and the first and second purchase agreements; a fourth step determines, using the processor and the first and second purchasing histories, a relative profitability of the first and second purchasing agreements; a fifth step modifies, using the processor, the relative profitability, and the AIP, the first or second requirement to increase revenue or profitability of the at least one business entity; and a sixth step transmits, using an interface element in the at least one specially-programmed general purpose computer, the modified first or second requirement for presentation to the customer.

The following should be viewed in light of FIGS. 1 through 3, the method steps described supra, and any other discussion supra. Although the following non-limiting discussion is directed to a present invention system, it is understood that the discussion also is applicable to a present invention method. The present invention leverages existing or future marketing systems, marketing programs, loyalty programs, sponsor programs, coupon programs, discount systems, incentive programs, or other loyalty, marketing, or other similar systems, collectively, "marketing systems" by adding programming logic, self-learning, and self-adaptation to generate or modify an agreement or incentive, for motivating a desired behavior by a customer. The present invention can use any, all, or none of the following considerations as part of generating or modifying an agreement, incentive, or parameter, or performing the operations described supra, for example, by adding programming logic, self-learning, and self-adaptation as noted supra: any one or more data or variables available or accessible, including, for example, any customer, business or sponsor information, such as, membership in a loyalty or other marketing program, ordering preferences or history, current sales volumes or budgets or targets, current or planned local, regional or national marketing programs or objectives, device preferences, current speed of service, quality of service or other operating data, budgets, objectives or trends, etc.

In one embodiment, the present invention employs any, all, or none of the following considerations as part of generating or modifying an agreement, incentive, or metric, or performing the operations described supra, for example, by adding programming logic, self-learning, and self-adaptation as noted supra:

1. Parameters or data regarding a customer, for example, history 134. For example, an agreement or incentive can be made more attractive to the customer if the customer is a loyal customer or if the business entity wishes to entice the customer to purchase a good seldom ordered by the customer in the past. Proclivity to accept or reject offers of the same or other types. Customer objectives also can be considered.
2. The customer class or type. For example, an agreement or incentive can be made more attractive to the customer if the customer is grouped with loyal customers or if the business entity wishes to entice the customer group to purchase a good seldom ordered by the customer group in the past. Customer group objectives also can be considered.
3. Temporal parameters, such as the time of day, week, month, or year. For example, the system can reduce prices in an agreement or incentive to encourage sales during times of historic low sales volume or increase prices in the incentive during times of historic high sales volume.

4. The good or service involved in a past, current, or possible future transaction between the customer and the business entity. For example, an agreement or incentive for items with a short shelf life can be made more attractive to encourage a larger volume of orders for the items.
5. Inventory on hand. For example, an agreement or incentive can be modified to encourage sale of overstocked items or to maximize profits for items in short supply.
6. Specifics of a transaction. With the use of the AIP, system 100 can automatically, dynamically, and intelligently adapt an agreement or incentive to any parameter associated with a particular transaction. Further, the parameters to which the system is to adapt the price can be automatically, dynamically, and intelligently selected or modified.
7. Physical parameters of the transaction process. For example: order entry device, e.g., point of sales (POS) terminal, kiosk, cell phone, PDA, laptop, IED, etc.; POS device or station, e.g., front counter, drive through, retail station, call center, location on counter, e.g., first station vs. second, third fourth or other station, etc.; output display device (e.g., customer facing display, kiosk, cell phone, PDA, laptop, IED, etc.); or in a quick serve restaurant, an agreement or incentive can be modified to encourage use of self-service kiosks, which may optimize revenue for the business entity, or to discourage use of a point of sales station attended by an employee.
8. Rate of sale of items. For example, prices in an agreement or incentive can be increased for goods that are selling rapidly or reduced for goods that are selling slowly.
9. Reservations. For example, to encourage customers to make reservations at a sit down restaurant, prices in an agreement or incentive can be reduced for orders placed by customers making reservations.
10. Regular orders. For example, based on the transaction history, prices in an agreement or incentive for a restaurant can be reduced for items regularly ordered by a customer or prices can be reduced on items rarely ordered by a customer to encourage the customer to order the rarely ordered items.
11. Employee. For example, to increase prices for an agreement or incentive handled by an employee with a high success rate of handling such incentives.
12. The nature of the transaction, for example, determining feasible upsells to include in an agreement or incentive.
13. The location at which the transaction is occurring, for example, lowering the price in an agreement or incentive to encourage patronage at a location.
14. Business Information or objectives, for example, maximizing or increasing revenue or profitabililty.
15. Sponsor Information or objectives.
16. Marketing Program Type.
17. Opt In Information.
18. Payment method or terms or conditions of payment.
19. Marketing Message Contents.
20. Marketing Offer Objectives.
21. Expected or Actual System Results or tracking data.
22. System determined discounts or other incentives required to achieve desired results.
23. One or more table entries provided by one or more end users, for example, a system administrator.
24. One or more rules provided by one or more end users, for example, a system administrator.
25. One or more genetic algorithms or other AI based rules or determination methods.
26. Point within transaction, e.g., pre-order, mid-order, post order, etc.
27. Loyalty program information.
298. Current store activity, e.g., high or low volumes of transactions.
29. Customer survey information.
30. Financial considerations, such as total current price/profit, total expected price/profit, regular or discounted price, gross margins, profit margins, labor rates, labor availability, marketing funds available, or third party funds available, budget.
31. Expectation of accept or reject of one or more offers in an agreement or incentive at one or more price points in the agreement or incentive.
32. Current, prior or expected level of dilution, gaming, fishing, accretion.
33. Business, customer, or employee target goals.
34. Current or planned local, regional or national or other marketing campaigns, including, for example, product introductions, price or other promotions, print, radio or television or other advertisements, e.g., newspaper coupon drops, etc.
35. Business, customer, sponsor, or system objectives.
36. Business, customer, sponsor, third party, or system information.
37. Any other information, data, rules, system settings, or otherwise available to the marketing system or disclosed invention or the POS system or other system designed to deliver one or more marketing messages, offers, or coupons, etc.
38. Any combination or priority ranking of any two or more of the foregoing.

In one embodiment, agreements, histories, incentives, metrics, or other parameters, are created or maintained centrally or in a distributed network, including, for example, locally. Such management may be accomplished via any applicable means available, including, for example, making use of existing, e.g., off the shelf or customized tools that provide for such creating, management or distribution.

In another embodiment, in an effort to further enhance generating or modifying an agreement, an incentive, or a parameter or to otherwise improve one or more aspects of the present invention, the invention may access certain information from existing systems, including, for example, existing POS databases, such as customer transaction data, price lists, inventory information or other in or above store, for example, location data, including, but not limited to data in a POS, back office system, inventory system, revenue management system, loyalty or marketing program databases, labor management or scheduling systems, time clock data, production or other management systems, for example, kitchen production or manufacturing systems, advertising creation or tracking databases, including click through data, impressions information, results data, corporate or store or location financial information, including, for example, profit and loss information, inventory data, performance metrics, for example, speed of service data, customer survey information, digital signage information or data, or any other available information or data, or system settings data.

In one embodiment, each location associated with the present invention establishes its own rules, uses its own AIP or generic algorithm, or learns from local customer behavior or other available information. In another embodiment, the present invention shares some or all available information or results data among any two or more or all locations or locations that fall within a given area, region, geography, type, or other factors, such as customer demographics, etc., and makes use of such information to improve the present invention's ability to perform present invention operations described supra and infra.

For example, when using an AI based system, such as disclosed in commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007," one location may discover or otherwise determine that a certain type or class of agreements, incentives, or metrics are particularly effective. By sharing such information among other locations, for example, similar locations, the present invention can begin to make use of the same or similar agreements, incentives, or metrics in other generally similar locations or with similar customers or classifications of customers so as to improve the performance of one or more other such locations or all locations. In this fashion, the present invention can learn which desired agreements, incentives, or metrics generally achieve the desired results or improve trends towards such results. Likewise, the present invention can more quickly determine which agreements, incentives, or metrics do not yield the desired results or determine how long such agreements, incentives, or metrics are required to achieve the desired results.

In one embodiment, agreements or incentives are provided or subsidized by one or more third parties, including, for example, third party sponsors. For example, a vendor supplying an item in an agreement or incentive could subsidize the agreement or incentive to encourage acceptance of the item. In another example, such an offer may be partially or fully subsidized by an unrelated third party sponsor. For example, as part of an agreement or incentive, a telecommunications company offers to view an advertisement for telecommunications company or fill out a survey or perform some other action or accept a subsequent or related optional or required offer, etc.

In one embodiment, customers are grouped by the processor according to similarities in transaction history or other customer information, for example, using history 136. The system generates, modifies, or uses an agreement, incentive, or metric per the grouped customers.

In one embodiment, the operations of the processor and the AIP, described supra and infra, include the generation of executables as disclosed by commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007.

In one embodiment, the present invention generates, modifies, or uses an agreement, incentive, or metric based upon other performance data or results, for example, the transaction history. In another embodiment, the present invention determines the impact of transaction histories, agreements, incentives, or presentations on the ability or proclivity of an employee or customer to game or fish the present invention. The system accordingly avoids or ceases transaction histories, agreements, incentives, or presentations and/or changes the type of transaction histories, agreements, incentives, or presentations provided or suppressed.

In one embodiment, transaction histories, agreements, incentives, or presentations vary from customer to customer or from time to time, or one or more of these may be consistent regardless of the customer, time, or other information. In a another embodiment, where transaction histories, agreements, incentives, or presentations vary, such transaction histories, agreements, incentives, or presentations are determined via any applicable means and using any available information to make such determination, including, for example, any available customer, account, business, or sponsor information or any one or more customer, account, business, or sponsor objectives or any combination of the forgoing. In a further embodiment, transaction histories, agreements, incentives, or presentations are further determined or modified based upon information or needs or business objectives of one or more suppliers or competitors of such suppliers. For example, if a WCD is within a geographical area for a location selling competing items A and B, an agreement or incentive are generated and transmitted for one or both of the items and vendors for the items underwrite the cost for the price to the business entity. In one embodiment, one or more of the above operations are performed using the AIP.

In one embodiment, a present invention system generates, modifies, or uses transaction histories, agreements, incentives, or presentations based upon current or previous buying habits or any other available information regarding a customer. If for example, an end user is a loyal customer for item A, the present invention can increase the price in the incentive for item A or decrease the price in the incentive for a different item depending upon any known factors, for example, did the customer receive or act upon an offer for item B. If the customer did receive or act upon a reminder for item B, in another embodiment, the present invention reduces a cost in the incentive for item A as a blandishments to purchase item A instead of item B, or matches or beats a price for item B, or queries such loyal (or other) customer to determine what price such customer would require to purchase item A. In this fashion a competitive environment is created.

In one embodiment, the end user of a present invention system modifies the rules or method of operation so as to favor itself. For example, in the previous example, if the producer of item A were the sole end user of the present invention, the producer may choose to not share any part or all of any such customer information or may use knowledge of any reminder regarding item B to its benefit. In another example, if a grocery chain was the sole end user of the present invention, the end user may choose to provide equal access to the present invention or favor one or more of its suppliers based upon any one or more of its business objectives, for example, the profitability or perceived or actual quality or consistency or pricing of such one or more suppliers. In one embodiment, one or more of the above operations are performed using the AIP.

In one embodiment, in order to receive an agreement or incentive, customers are required to opt in to a cellular marketing program or some other loyalty program indicating their desire or providing permission for such marketing system or the business entity to send one or more such agreement or incentive. In this fashion, only those interested in such communications will be sent such communications.

In a further embodiment, an agreement or incentive is modified for prospective customers having an identity previously provided by an existing customer, as described in commonly-owned U.S. patent application Ser. No. 12/217,863, titled: "SYSTEM AND METHOD FOR PROVIDING INCENTIVES TO AN END USER FOR REFERRING ANOTHER END USER," inventors Otto et al., filed Jul. 9, 2008, which application is incorporated by reference herein.

In one embodiment, the present invention improves results over time or with use of the invention. Such improvement or optimization can be accomplished via any means necessary including any of several methods well known in the art or as disclosed by applicants and incorporated herein by reference, including, for example, commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007; commonly-owned U.S. patent application titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008; and commonly-owned U.S. patent application titled: "METHOD AND APPARATUS FOR GENERATING AND TRANSMITTING AN ORDER INITIATION OFFER TO A WIRELESS COMMUNICATIONS DEVICE," inventors Otto et al., filed May 2, 2008. For example, statistical methods can be used to determine which agreements, incentives, or presentations generally yield the desired or optimal or generally better results, or such results may be determined using artificial intelligence, for example, one or more genetic algorithms, or a present invention administrator/operator can review results reports and then provide manual weighting criteria to further define or control the present invention, or a combination of these and other well known methods may be employed in any combination or in any order or priority.

In one embodiment, a present invention incentive includes a discount. Such discounts can be associated or applied to specific items, or to an entire order. In one embodiment, discounts are determined based upon rules established by management of the present invention or as established or modified from time to time by any authorized personnel, or may be initially established or modified using a learning system, e.g., a genetic algorithm. In any such case, the present invention can make use of any or all available information, including, but not limited to transaction history and customer information. Discounts can be designed to maximize, minimize or optimize any one or more business or customer objectives as desired or indicated. In another embodiment, the discount, if any, is presented to the customer as a percentage discount or as a cents or other amount off discount. In one embodiment, one or more of the above operations are performed using the AIP.

In one embodiment, discounts in incentives are used/tried relatively sparingly to determine the price elasticity of customers, both as a whole and/or by class, group, demographics, type or order contents, base order amounts, and/or specific customer's buying habits and acceptance/rejection information. In this fashion, the present invention can, over time, yield optimal results by learning or otherwise determining what price reductions, if any, are required given the known information. For example, if a customer has not complied with an agreement, the present invention could include a price offering a 10% discount in an incentive if the customer complies with the agreement. If the customer rejects such offer, the present invention could offer a larger discount in the incentive, for example, for a 20% discount. Once the present invention determines an agreement holder's price points, and/or a holder becomes habituated to executing agreements, the present invention can reduce or eliminate related discounts or other incentives. In one embodiment, one or more of the above operations are performed using the AIP.

In one embodiment, the present invention, having acquired data regarding customer price elasticity, compliance, or other information, uses such information to determine other agreements, incentives, metrics, or presentations for the same or generally similar customers, e.g., other customers who fail to comply with a type of agreement. In another embodiment, using such logic, the present invention determines classifications of customers and leverage use of such information by providing agreements, incentives, metrics, or presentations that also are optimized from the location or location management perspective/objectives. In one embodiment, one or more of the above operations are performed using the AIP.

In one embodiment, an administrator can add or change or otherwise modify the previous listing, or data, or determine the order of priority or preference of each such discrimination factors or preferences or data, including, for example, location, payment or device, ranking each in order of such preference or providing table, rules or other entries to provide or assist or to support determining which are preferred or the amount of incentive available or increased or decreased incentive, as a percentage or absolute or relative or other dollar or other calculation method to determine what price modifications, if any to make, at which locations, devices or payment methods or other discriminating factors, for example, customer or business preferences or customer, business, sponsor or other entity information, objectives, rules or other available information or rules or system settings. By providing or otherwise manually or automatically determining such rankings, the disclosed invention can initially or continuously evaluate potential pricing and modify such pricing or provide other incentives to drive a desired percentage of business or customer transactions to one or more particular devices, locations or payment methods. In one embodiment, one or more of the above operations are performed using the AIP.

In one embodiment, the present invention provides such incentives initially, or on an ongoing basis or only until certain objectives are achieved or certain customers or all customers are generally habituated to compliance to agreements, after which, in certain embodiments, the present invention may reduce incentives, or may only periodically provide full discounts or reduced discounts so as to reinforce such behavior. In another embodiment, a system administrator or other end user establishes such rules or conditions. In one embodiment, one or more of the above operations are performed using the AIP.

In one embodiment, the present invention makes such determinations using an automated means. Such automated means includes, for example, a system that periodically or generally continuously tests different transaction histories, agreements, incentives, metrics, or presentations or other methods, for example, user interfaces, or other benefits or incentives, and based upon such testing, determine which transaction histories, agreements, incentives, metrics, or presentations or other benefits yield the desired compliance, for example, with a business objective. Such automated system may periodically cease providing such incentives once it is determined that the desired customer behavior has been established, habituated or otherwise persists without need for such continued incentive. If such system subsequently determines that the desired behavior has ceased or fallen below a desired level, such system can then reinstate an appropriate incentive. When reinstating such incentive, the present invention can return to previously successful levels, or can provide different transaction levels on a temporary, periodic or permanent basis. Such reinstatement may be provided for all customers, certain customers, classes of customers, or only those customers that have ceased or have generally reduced their frequency of desired behavior. In one embodiment, one or more of the above operations are performed using the AIP.

In one embodiment, the present invention tests transaction histories, agreements, incentives, metrics, or presentations or provides certain pricing on a periodic basis within a single location or among a plurality of locations so as to determine the extent or requirement regarding any such transaction histories, agreements, incentives, metrics, or presentations or other benefits. For example, by testing incentive levels, the present invention can determine the level of incentive needed to attain a business goal, or such a system can further determine the extent of any gaming, dilution, diversion or accretion. By alternating offering and not offering incentive modification or by testing various levels of incentives, the present invention can better determine the optimal incentive, discount or benefits required, if any, to achieve the desired results, while minimizing or mitigating any undesirable effects of using or deploying such system. Such testing can be accomplished via any applicable or available means, including those previously disclosed by applicants herein and within the referenced applications, or randomly or using rules or AI based systems. By periodically testing or making changes to such transaction histories, account data, metrics, desired transactions, incentives, or presentations or benefits, the present invention can continually strive to achieve the optimal mix and level of transaction histories, agreements, incentives, metrics, or presentations. By combining the use of one or more of a table, rules or AI based system, including, for example, as disclosed in the applications incorporated by reference herein, a more effective, responsive, adaptive, and dynamic marketing system may be developed and deployed that achieves optimal or nearly optimal results over both the short and long term.

In one embodiment, the present invention tests customers of one or more locations using, different agreements, incentives, metrics, or presentations at different locations. By comparing the results data from such test and control groups of locations, the present invention can better determine which incentives are accretive or provide net benefit or are subject to gaming, fishing or other fraudulent or undesirable activities. Such testing can be performed within a single unit as well, by periodically offering such incentives to the same or similar customers or by randomly providing or not providing such incentives. In one embodiment, one or more of the above operations are performed using the AIP.

In one embodiment, the present invention makes use of a combination of such testing methodologies in order to best determine which agreements, incentives, metrics, or presentations yield optimal or the best results given the present invention information, parameters or any one or more customer, business, sponsor or present invention objectives. For example, the present invention tests in a single or group of stores certain new or untested agreements, incentives, metrics, or presentations, and, combines such test with a periodic modification of agreements, incentives, metrics, or presentations, for example, toggling, between higher and lower price discounts, which toggling, may be random, 50/50, or may be intelligently determined, for example, using the AIP, based upon system information, and continue such test for a period of time, for example, one month, while comparing results of such tests with a similar number of stores in a control group, and then, switch the process, for example, test within the original control group and stop modified agreements, incentives, metrics, or presentations with respect to the original test group. In this fashion the present invention determines the effects of agreements, incentives, metrics, or presentations modifications and the effect of such modifications on customers, customer buying habits, store or business results, or any other measures, including, for example, testing for dilution, diversion, accretion, gaming or fishing. In one embodiment, one or more of the above operations are performed using the AIP.

In one embodiment, a system administrator is able to enter or modify or delete or otherwise provide transaction histories, agreements, incentives, metrics, or presentations using an interface provided for such purposes. When establishing messages or content of transaction histories, agreements, incentives, metrics, or presentations, such administrator or other end user may be further permitted to designate which transaction histories, agreements, incentives, metrics, or presentations are to be generally used when using a particular type of communications. For example, one type of transaction history, agreements, incentives, metrics, or presentations may be designated for use when communicating via cell phone and another transaction history, agreements, incentives, metrics, or presentations used for email and still other versions for each or all of the other various methods of communications. In another embodiment, the present invention tests each transaction history, agreements, incentives, metrics, or presentations with each such communications method to determine, partially or wholly, which transaction history, agreements, incentives, metrics, or presentations yields the best or optimal results over time or based upon any available information, including, for example, any available or otherwise accessible customer, business or sponsor information or objectives or by tracking actual activities and results or changes in behavior as expected or predicted by customers or other end users or classes or categories of uses or by device, location or payment method. In a further embodiment, one or more of the above operations are performed using the AIP.

The following is a listing of exemplary hardware and software that can be used in a present invention method or system. It should be understood that a present invention method or system is not limited to any or all of the hardware or software shown and that other hardware and software are included in the spirit and scope of the claimed invention.

1. Hardware:
    a. Central Controller or Local Controllers. The present invention can be managed by a central system on behalf of multiple business entities or locations or systems associated with portions of the multiple business entities or locations can implement the present invention.
    b. Retailer System 1-*n*
    c. End User Device 1-*n*
2. Software:
    a. Offer Management Program manages agreements.
    b. Offer Adjustment and Creation Program: Generates agreements, requirements, incentives, or metrics; modifies same, for example, based on transaction histories; generates and modifies presentations for agreements; accepts offers for agreements; and modifies offered agreements as applicable. Uses artificial intelligence, for example, generic algorithms, as applicable.

The following is a listing of exemplary data bases that can be used in a present invention method or system. It should be understood that a present invention method or system is not limited to any or all of the databases shown and that other databases are included in the spirit and scope of the claimed invention:

Transaction Database-stores transaction data, including subscription program data Consumer Database-stores consumer data, including subscription program data Inventory Database-stores inventory information Offer Database-stores available offers
Offer Rules Database-stores rules for making offers
Live Offers Database-stores active subscription programs for:
  Complaints
  Cancellation
  Modification request
  Revenue
  Profit
  Manufacturer Subsidy
  Reminders 1-$n$
  Products 1-$n$
  Retailers 1-$n$
  Rules 1-$n$
  Conditions 1-$n$
  Penalties 1-$n$
  Consumers 1-$n$
  Credit Cards to Secure Offer 1-$n$ It is to be understood that the embodiments and variations shown and described herein are merely illustrative of the principles of this invention and that various modifications may be implemented by those skilled in the art without departing from the scope and the spirit of the invention. For example, while the invention has been illustrated as being implemented using particular computer systems including hardware components such as a computer, POS terminals, portable employee terminals, and input and output devices, the invention could also be implemented using other hardware components and/or other interconnections between such components. Also, while the invention has been described as being implemented using a computer, some or all of the functionality could alternatively reside in a POS terminal or other computing device (e.g., a headset). The invention could also be implemented using discrete hardwired components instead of computers. Further, while the above description refers to particular databases, other databases or data structures could be used. In addition, while various embodiments of methods in accordance with the invention have been discussed which include specific steps listed in specific orders, a person of skill in the art will recognize that these steps can be performed in different combinations and orders. While other modifications will be evident to those skilled in the art, the present invention is intended to extend to those modifications that nevertheless fall within the scope of the appended claims.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. A self-learning computer-based method for managing a purchase agreement, comprising:
   storing, in a memory element for at least one specially-programmed general purpose computer an artificial intelligence program (AIP) and first and second metrics;
   receiving, using an interface element in the at least one specially-programmed general purpose computer, a request identifying a first plurality of customers and a desired incentive;
   generating, using the processor, the AIP, and the first metric, a first agreement between the first plurality of customers and at least one business entity, the first agreement including at least one first requirement regarding a first plurality of retail transactions between the first plurality of customers and the at least one business entity;
   generating a first incentive using the processor, the desired incentive, the second metric, and the AIP, the rewarding of the first incentive conditional upon satisfaction of the at least one first requirement; and,
   transmitting, using an interface element in the at least one specially-programmed general purpose computer, the first agreement and the first incentive for presentation to at least one customer from the first plurality of customers.

2. The method of claim 1 further comprising:
   compiling, using the processor, operational data regarding profitability of the at least one business entity; and,
   creating the first or second metric using the processor, the operational data, and the AIP.

3. The method of claim 1 further comprising:
   compiling, using the processor, a history of transactions conducted by the first plurality of customers; and,
   creating the first or second metric using the processor, the AIP, and the history; or wherein:
   generating the first agreement includes using the history; or,
   generating the incentive includes using the history.

4. The method of claim 1 further comprising:
   compiling, using the processor, a history of transactions conducted by the first plurality of customers; and,
   modifying the first agreement using the processor, the AIP, and the history; or,
   modifying the incentive using the processor, the AIP, and the history.

5. The method of claim 1 wherein the at least one requirement includes respective requirements for at least two customers in the first plurality of customers and wherein at least two of the respective requirements are different.

6. The method of claim 1 further comprising:
   storing a third metric in the memory element;
   compiling, using the processor, a history of transactions conducted by the first plurality of customers;
   selecting, using the processor, the history, the third metric, and the AIP, a second plurality of customer from the first plurality of customers, the second plurality including less than all of the first plurality;
   generating, using the processor, the AIP, and the first metric, a second agreement between the second plurality of customers and the at least one business entity, the second agreement including at least one second requirement regarding a second plurality of retail transactions between the second plurality of customers and the at least one business entity; and,
   generating a second incentive using the processor, the AIP, the desire incentive, and the second metric, the rewarding of the second incentive conditional upon satisfaction of the at least one second requirement.

7. A self-learning computer-based system for managing a purchase agreement, comprising:
   a memory element for at least one specially-programmed general purpose computer for storing:
     an artificial intelligence program (AIP); and,
     first and second metrics; and a processor in the at least one specially-programmed general purpose computer for:
receiving, using an interface element in the at least one specially-programmed general purpose computer, a request identifying a first plurality of customers and a desired incentive;
generating, using the AIP and the first metric, a first agreement between the first plurality of customers and at least one business entity, the first agreement including at least one first requirement regarding a first plurality of retail transactions between the first plurality of customers and the at least one business entity;
generating a first incentive using the desired incentive, the second metric, and the AIP, the rewarding of the first incentive conditional upon satisfaction of the at least one first requirement; and,
transmitting, using an interface element in the at least one specially-programmed general purpose computer, the first agreement and the first incentive for presentation to at least one customer from the first plurality of customers.

8. The system of claim 7 wherein the processor is for:
compiling operational data regarding profitability of the at least one business entity; and,
creating the first or second metric using the operational data and the AIP.

9. The system of claim 7 wherein the processor is for:
compiling a history of transactions conducted by the first plurality of customers; and,
creating the first or second metric using the AIP and the history; or wherein:
generating the first agreement includes using the history; or,
generating the incentive includes using the history.

10. The system of claim 7 wherein the processor is for:
compiling a history of transactions conducted by the first plurality of customers; and,
modifying the first agreement using the AIP and the history; or,
modifying the incentive using the AIP and the history.

11. The method of claim 1 wherein the at least one requirement includes respective requirements for at least two customers in the first plurality of customers and wherein at least two of the respective requirements are different.

12. The system of claim 7 wherein the processor is for:
storing a third metric in the memory element;
compiling a history of transactions conducted by the first plurality of customers;
selecting, using the history, the third metric, and the AIP, a second plurality of customer from the first plurality of customers, the second plurality including less than all of the first plurality;
generating, using the AIP and the first metric, a second agreement between the second plurality of customers and the at least one business entity, the second agreement including at least one second requirement regarding a second plurality of retail transactions between the second plurality of customers and the at least one business entity; and,
generating a second incentive using the processor, the AIP, the desire incentive, and the second metric, the rewarding of the second incentive conditional upon satisfaction of the at least one second requirement.

* * * * *